United States Patent [19]

Denmark et al.

[11] Patent Number: 5,794,647
[45] Date of Patent: Aug. 18, 1998

[54] VALVE SYSTEM

[75] Inventors: Martin William Denmark, Telford; Phillip John Haseley, Newport, both of United Kingdom

[73] Assignee: BTR plc, London, England

[21] Appl. No.: 727,420

[22] PCT Filed: Apr. 4, 1995

[86] PCT No.: PCT/GB95/00764

§ 371 Date: Dec. 23, 1996

§ 102(e) Date: Dec. 23, 1996

[87] PCT Pub. No.: WO95/27864

PCT Pub. Date: Oct. 19, 1995

[30] Foreign Application Priority Data

Apr. 6, 1994 [GB] United Kingdom ............... 9406769

[51] Int. Cl.$^6$ .................... F16K 1/22; F16K 43/00
[52] U.S. Cl. .................... 137/315; 137/317; 137/637.1; 137/637.3; 251/305; 251/308
[58] Field of Search ............... 137/315, 317, 137/318, 637, 637.1, 637.2, 637.3; 251/326, 327, 328, 329, 95, 111, 113, 116, 305, 308, 292; 138/94

[56] References Cited

U.S. PATENT DOCUMENTS

| | | | |
|---|---|---|---|
| 161,698 | 4/1875 | Meloon | 251/328 |
| 518,785 | 4/1894 | Lenderking | 251/308 |
| 660,525 | 10/1900 | Burritt | 137/318 |
| 868,182 | 10/1907 | Hayden | 251/305 |
| 955,948 | 4/1910 | Davis | 251/305 |
| 955,979 | 4/1910 | Murphy | 251/308 |
| 2,105,343 | 1/1938 | Briggs | 251/308 |
| 2,829,862 | 4/1958 | Wey | 251/329 |
| 2,942,841 | 6/1960 | Stillwagon | 251/326 |
| 3,070,345 | 12/1962 | Knecht | 251/305 |
| 3,224,729 | 12/1965 | Beurel | 251/329 |
| 3,314,442 | 4/1967 | Volpin | 251/329 |
| 3,559,951 | 2/1971 | Whiteman, Jr. | 251/328 |
| 3,637,188 | 1/1972 | Ung | 137/637.2 |
| 3,934,851 | 1/1976 | Illing | 137/637.3 |
| 4,377,181 | 3/1983 | Chan | 251/306 |
| 4,977,917 | 12/1990 | Adams | 137/637.3 |
| 5,036,816 | 8/1991 | Mann | 137/637.3 |
| 5,117,867 | 6/1992 | Adams | 137/637.1 |
| 5,150,735 | 9/1992 | Bandy et al. | 137/614.06 |
| 5,168,900 | 12/1992 | Johnson | 137/637.3 |
| 5,295,507 | 3/1994 | Bandy et al. | 137/614.06 |
| 5,647,399 | 7/1997 | Andersen | 137/637.3 |

FOREIGN PATENT DOCUMENTS 679706 9/1952 United Kingdom ............... 251/101

*Primary Examiner*—George L. Walton
*Attorney, Agent, or Firm*—Stevens, Davis, Miller & Mosher, L.L.P.

[57] ABSTRACT

A valve system for use in batch processing, particularly for preventing exposure of material to the environment during transfer from one container to another. The system in effect comprises two butterfly valve discs (5, 6; 105, 106), one (5; 105) on a container (12; 107) for transporting material to or from a reaction vessel (3; 103) and the other on the reaction vessel (3; 103) itself. Each valve disc (5, 6; 105, 106), when closed, shuts off the container (12; 107) or vessel (3; 103) respectively from the environment. When the container (12; 107) is connected to the vessel (3; 103) a shaft (9; 109) connected to one valve disc (5; 105) interengages with a shaft (10) connected to the other valve disc (6; 1006) to enable the discs (5, 6; 105, 106) to move simultaneously, and material may be transferred from the container (12; 107) to the vessel (3; 103) or vice versa.

9 Claims, 6 Drawing Sheets

5,794,647

1
VALVE SYSTEM

CROSS-REFERENCE TO RELATED APPLICATIONS

This application is a 371 of PCT/GB95/00764, filed Apr. 4, 1995.

This invention relates to a valve system and in particular relates to a butterfly valve system which may be used to prevent exposure of material to the environment during transfer from one container to another.

For example it may be necessary to isolate a chemical e.g. a pharmaceutical material, from contamination e.g. airborne contamination, in order to maintain purity or sterility. Alternatively, if the material is toxic there is a need to prevent harmful contamination of the surrounding environment and/or atmosphere.

The valve system of the present invention is intended to meet these requirements.

In accordance with the invention a valve system comprises a first member having a first circular aperture sealable by a first disc connected to a first shaft provided with a formation, a second member having a second circular aperture sealable by a second disc having a second shaft provided with a formation complementary to that provided on the first shaft, the first and second members being capable of being connected together with the first disc positioned alongside the second disc with the formation on the first shaft interengaged with the formation on the second shaft, and the first and second discs being capable of simultaneous rotation about a single axis.

Preferably the first and second members are provided with first and second seals respectively against which the first and second discs seat in the closed condition.

Preferably a locking device is provided associated with one of the first and second members to ensure that the associated aperture on one of the first and second members remains closed while the first and second members are not connected.

A first stub axle provided with a formation may be connected to the first disc diametrically opposite to and coaxial with the first shaft, and a second stub axle provided with a formation complementary to that provided on the first stub axle may be connected to the second disc diametrically opposite to and coaxial with the second shaft, whereby when the first and second members are connected together with the first disc positioned alongside the second disc, the formation on the first stub axle is interengaged with the formation on the second stub axle.

Alternatively, the second stub axle may be connected to the first disc and/or interengaged with the first stub axle.

Two embodiments of the invention will now be described by way of example with reference to and as illustrated in the accompanying drawings of which:

2

Figure 4:
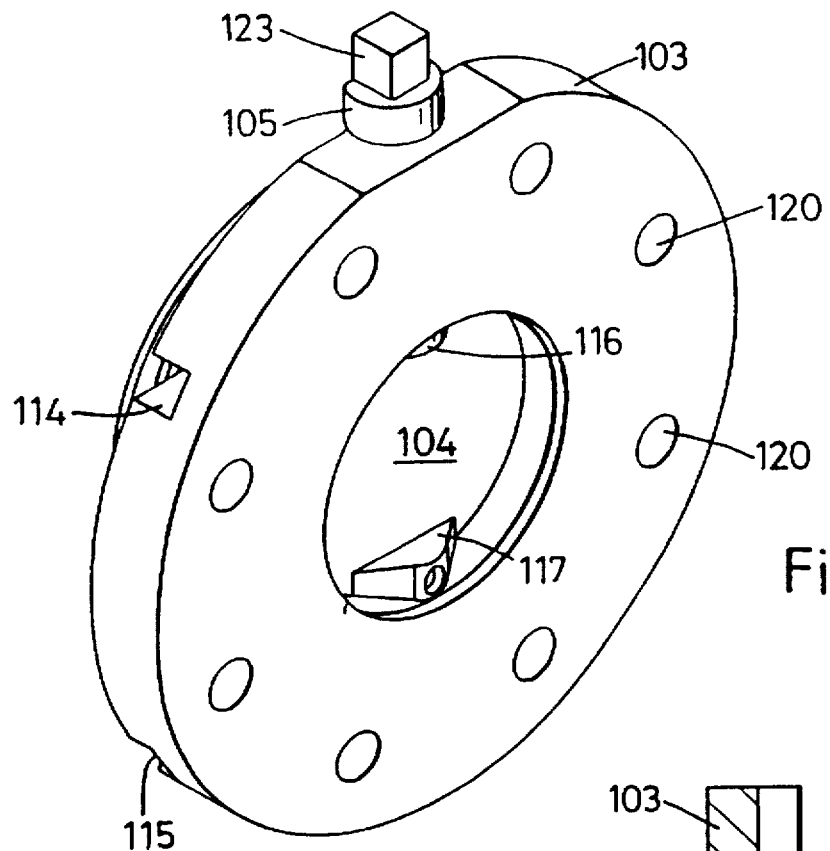
FIG. 4 is a perspective view from one side of the first member and first disc of the valve system according to the second embodiment of the invention.
Figure 5:
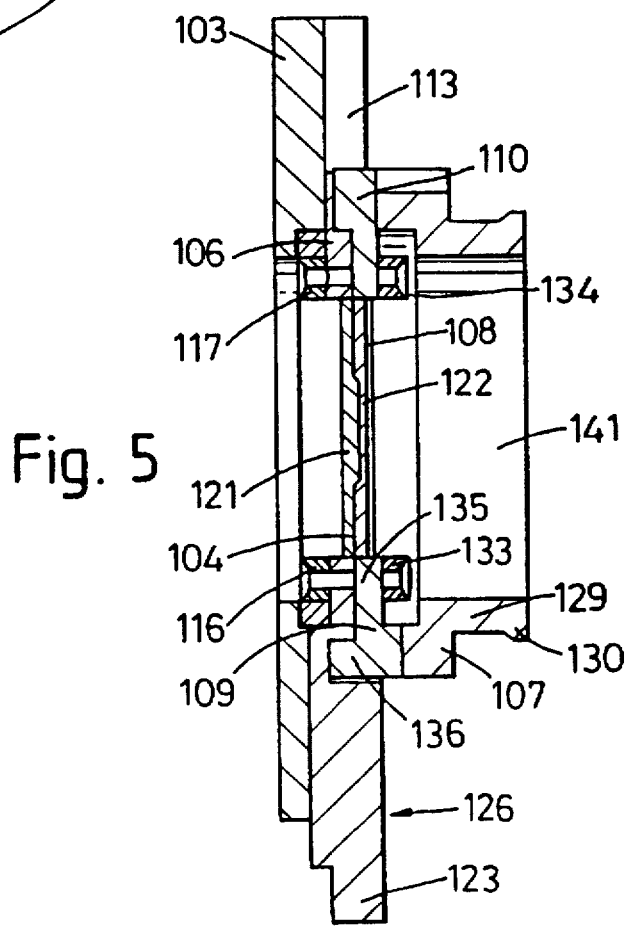
Figure 6:
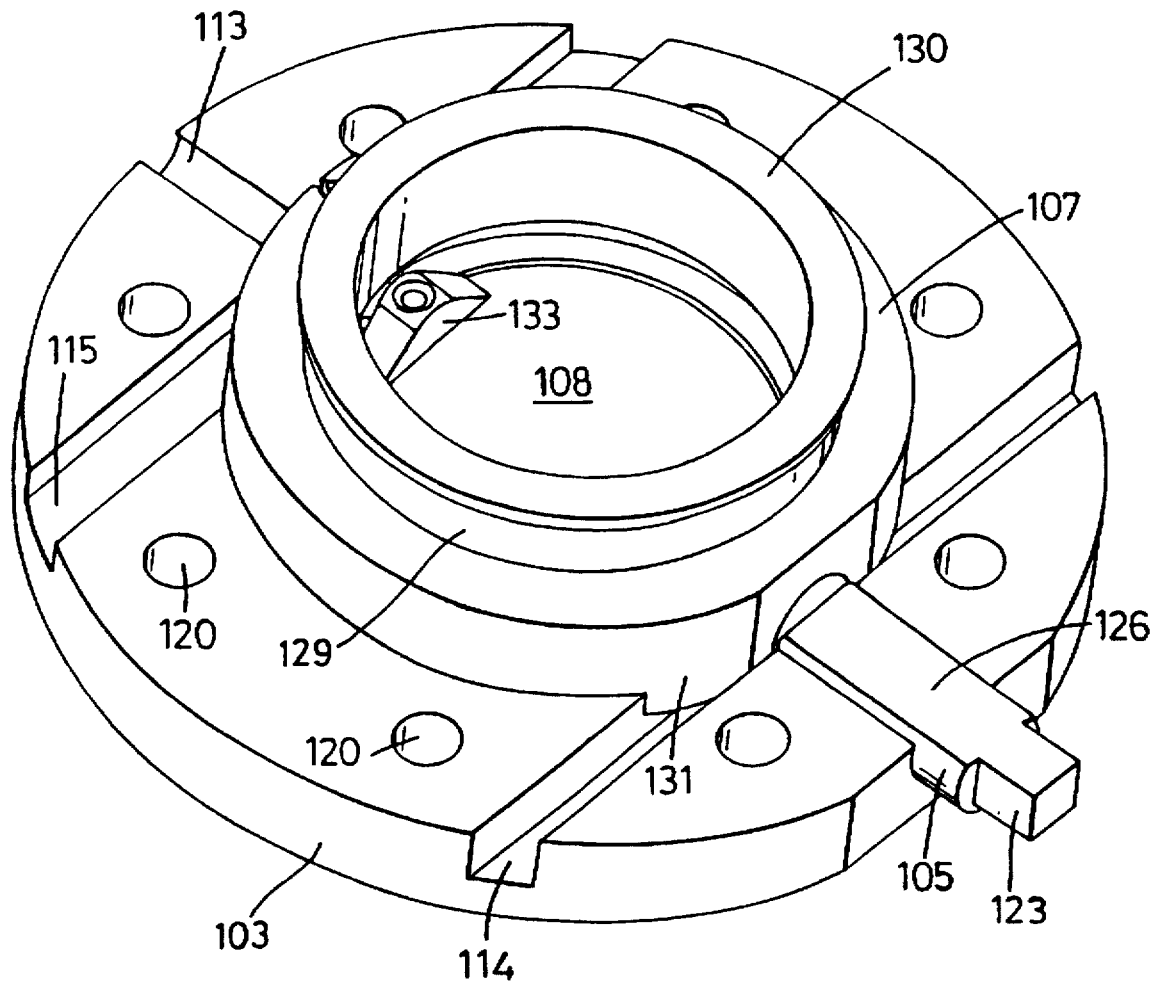
Figure 7:
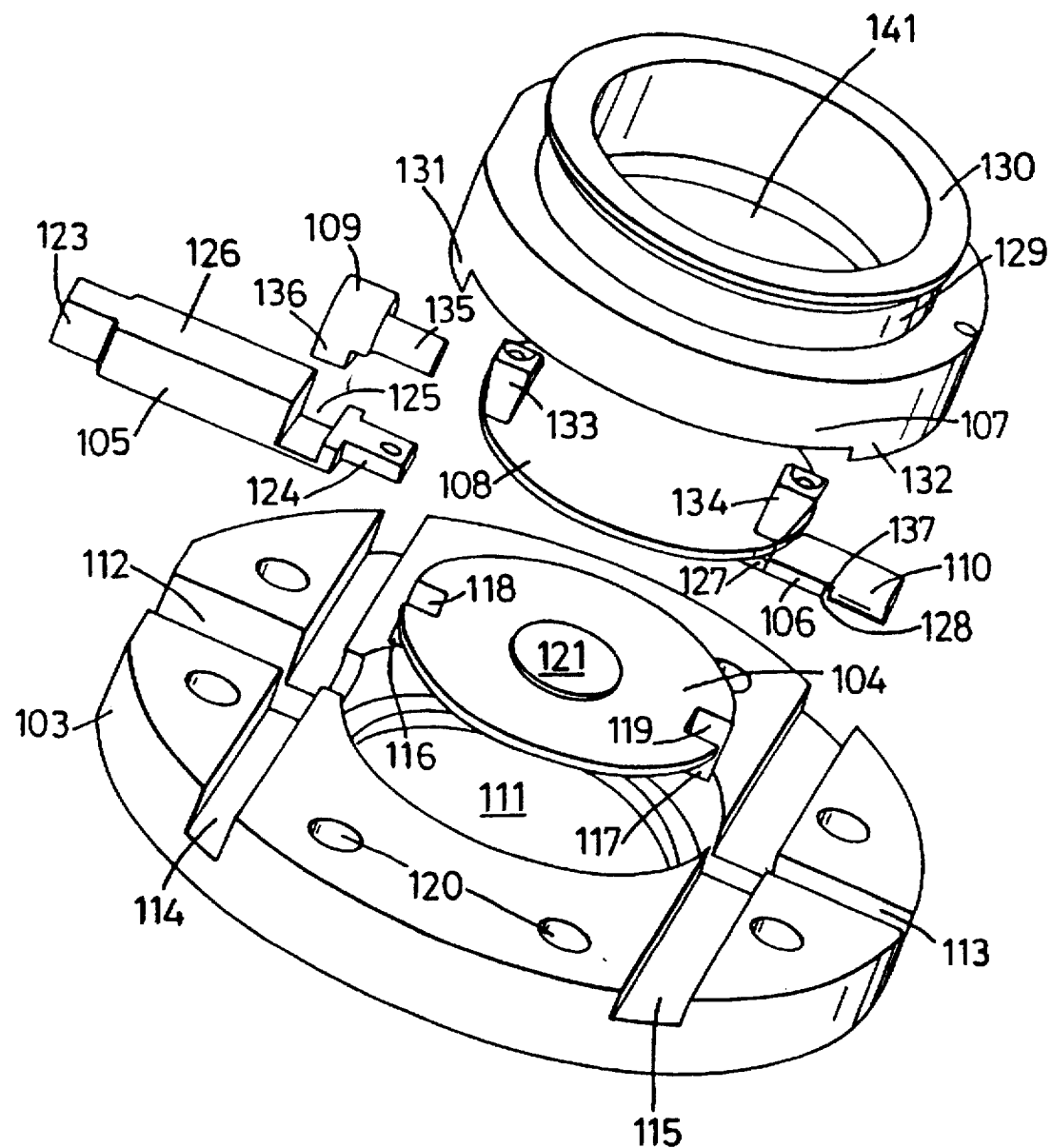

FIG. 5 is a cross-sectional view of the valve system according to the second embodiment;

FIG. 6 is a perspective view from the other side (compared to the view of FIG. 4) of the valve system of the second embodiment; and FIG. 7 is an exploded view of the valve system of the second embodiment.

Figure 1:
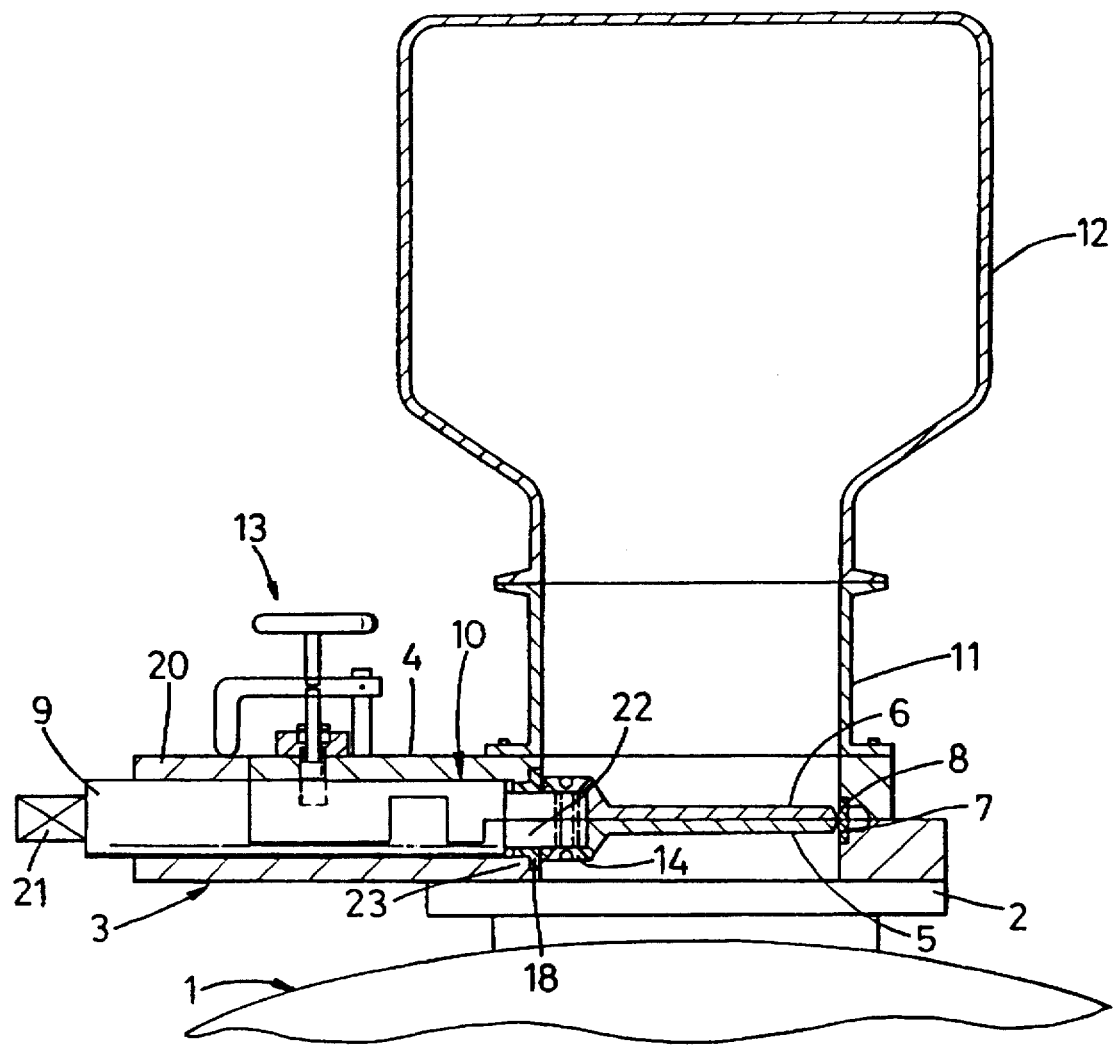
FIG. 1 shows a cross-section through part of a containment assembly including a valve system in accordance with the first embodiment of the invention.
Figure 2:
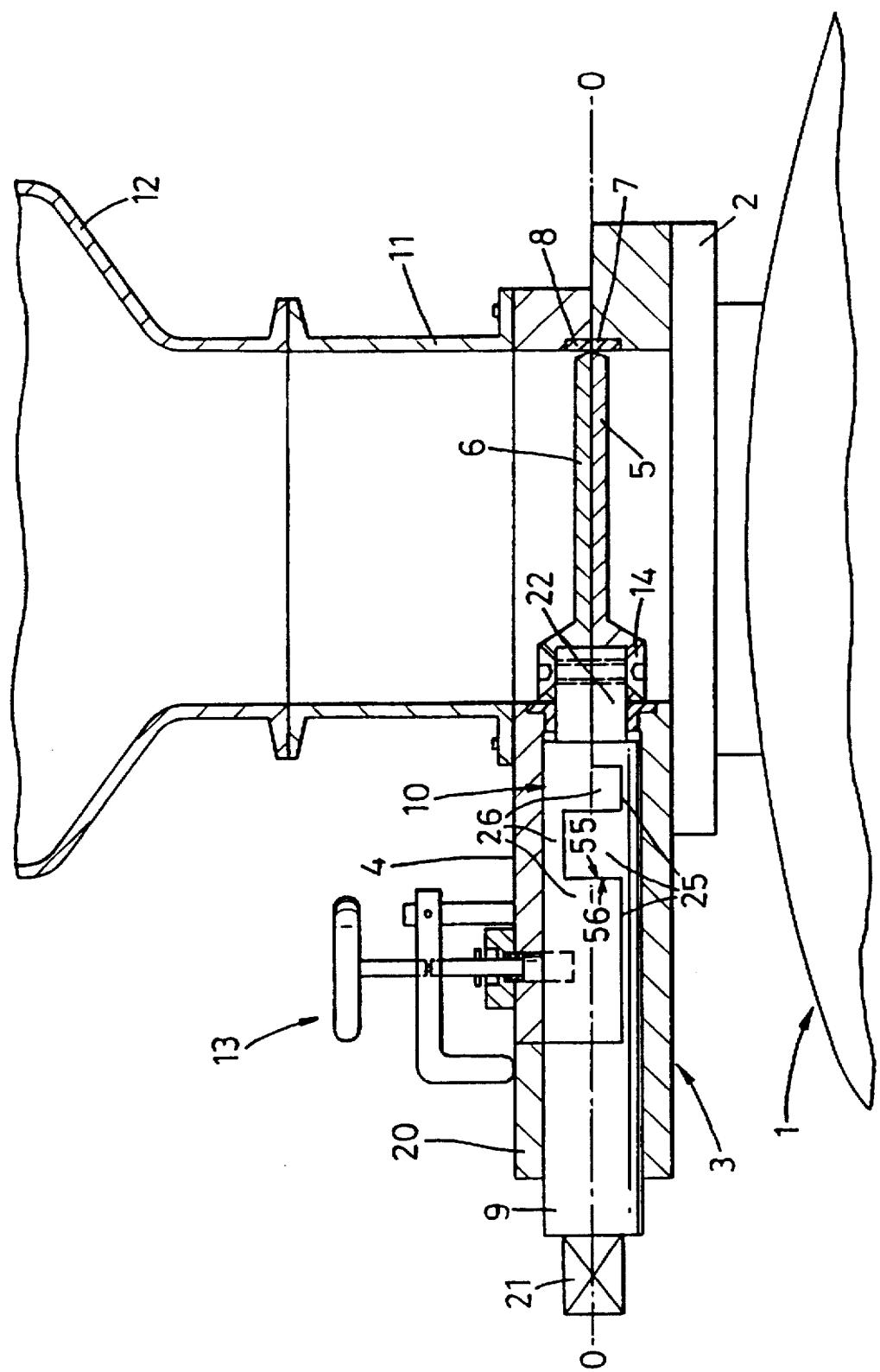
FIG. 2 shows a cross-section through part of the assembly shown in FIG. 1 on an enlarged scale.
Figure 3:
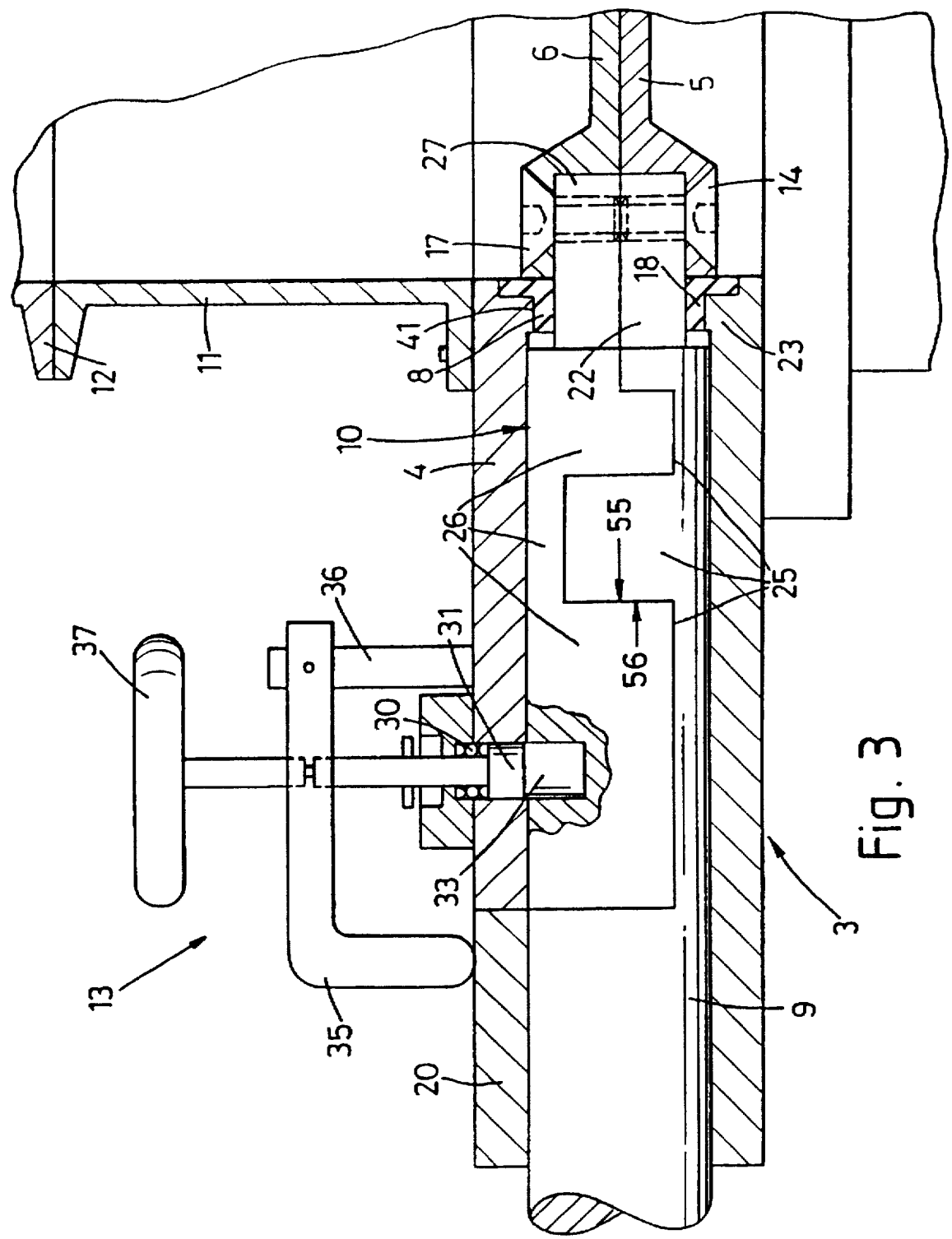
FIG. 3 shows a cross-section through part of the assembly shown in FIG. 1 on a further enlarged scale and including a locking device.

The containment assembly shown in FIGS. 1–3 comprises a valve system in accordance with the first embodiment of the invention and comprises two members: a vessel valve body 3 and a pack valve body 4. Two vessel valve bodies are intended to be secured to a vessel in which processing occurs, one to an inlet of the vessel and the other to an outlet. The vessel is constructed of a material suitable to withstand processing reactions within. The pack valve body is attached to a portable pack 12 in which material to be processed may be conveyed to the processing equipment or in which processed material may be conveyed away form the processing equipment to another position e.g. where the materials are used, and accordingly the material from which the pack is constructed does not require to withstand reaction and may be selected to minimise weight.

When assembled together the processing vessel, the two vessel valves, one at the vessel inlet and the other at the vessel outlet, the two packs each with an associated pack valve, form a sealed system and materials may be transferred from the vessel to a pack or vice versa without risk of contact with or contamination by or of the surrounding environment and/or atmosphere. Additionally, when the sub-assembly of a pack 12 and associated pack valve is not connected to the sub-assembly of processing vessel 1 and vessel valve, each sub-assembly forms a sealed system on its own.

A plurality of sub-assemblies each comprising a pack 12 and a pack valve may be used. Materials to be processed may be conveyed to the processing equipment in such a sub-assembly of pack and pack valve. Further sub-assemblies, or the same subassemblies but in a clean condition, may be used to convey material after processing away from the processing equipment.

FIG. 1 shows part of the containment assembly i.e. the vessel valve body 3, the vessel valve disc 5, each at the inlet of the processing vessel 1, a pack 12 which is connected to the body 4 of the pack valve and the pack valve disc 6 by a cylindrical spacer 11. Material to be processed is contained in the pack 12, and when the valve system of pack valve and vessel valve are opened, is fed e.g. under gravity to the processing vessel 1. Similarly material which has been processed may be fed after processing e.g. under gravity to another pack connected to the outlet on the underside of the processing vessel through another valve system, also according to the invention, and as shown in the drawings, but inverted.

The vessel valve body 1 is of robust construction and has standard flange dimensions. The body is generally annular in shape having one entry for a first shaft 9 which is supported by a full journal housing 20 provided as part of the vessel valve body 3. One end of the shaft is provided with a square section end portion 21 to which a handle or actuator (not shown) may be connected. The opposite end of the shaft has a reduced diameter portion 22 which is connected by a screw 14 to the vessel valve disc 5. The inlet to the vessel is provided with a seal 7 against which the disc 5 seats when in the closed position. The shaft 9 is provided with a formation 25 comprising generally projections and recesses and the end portion 22 is supported in a semi-journal housing 23 close to the disc 5.

The pack valve is constructed and arranged to operate as a valve when mated with the vessel valve but also to be a seal for the portable sub-assembly of pack and pack valve when separated from the processing vessel and vessel valve. The pack valve comprises a body 4, a disc 6 a seal 8 and a shaft 10 and is constructed and arranged to be connected to a pack 12 via sleeve 11. The pack valve body 4 is of lighter construction than the vessel valve body in order to facilitate transportation.

The pack valve comprises a shaft 10 connected to the pack valve disc 6 by means of a screw 17 at a reduced end portion 27 in a semi-journal bearing 4 in the pack valve body and is provided with a formation 26 which is complementary to the formation 25 of the shaft 9 of the body valve. When the pack 12 is connected to the vessel as shown in the drawings, the two formations 25 and 26 on the shafts 9 and 10, inter-engage to form a rotatable shaft. The two end portions 22 and 27 which are each semi-cylindrical in shape, come together to form a cylindrical portion which seats in the two semi-journal bearings 23 and 41 close to the two discs 5 and 6. Part of the body of the pack valve also fits in to a recess in the body of the vessel valve to form a tubular sleeve for the combined shafts 9 and 10 as can be seen in the drawings.

The formations 25 and 26 on the two shafts 9 and 10 respectively are shaped to provide a safety interlock system which prevents the pack valve from being separated from the vessel valve whilst the valve system is open or, put another way, the pack valve may only be separated from the vessel valve whilst the valve system is closed. Different formations may be used for different materials intended to pass through the valve system, thus providing a means for preventing materials in a pack valve from being processed in the incorrect vessel, or the incorrect materials being processed. Thus particular formations are indicative of a particular material.

Since the formations comprise faces such as 55, 56 which extend perpendicularly of the rotational axis of the shafts 9 and 10, the faces being contiguous when the shafts are inter-engaged, they provide guide means for ensuring correct positioning of the shafts 9 and 10 and associated discs 5 and 6 when being connected together.

The two valve discs 5 and 6 are connected to their respective shafts 9 and 10 by means of respective screws 14 and 17 entering through half bosses formed at edges of the disc 5 and 6. The pack valve disc 6 is a mirror image of the vessel valve disc 5 and when the pack valve is connected to the vessel valve as shown in the drawings the two discs may be rotated through 90° simultaneously on rotation of the combined shafts 9 and 10 by means of an actuator or handle provided at the squared end portion 21 on the shaft 9 about a single axis O—O through the tubular sleeve.

To further prevent the pack valve disc from opening whilst the pack sub-assembly is separated from the vessel a locking device 13 is provided. This locking device comprises a handle 37 connected to a plunger 31 biassed by means of a spring 30 into an aperture 33 in the shaft 10 when the disc is in the closed position. The handle and plunger is fixed to a pivoting L-shaped arm 35 mounted on a support 36 attached to the pack valve body. When the pack valve is attached to the vessel valve, the arm is in contact with part of the vessel valve body causing it to pivot and move the plunger 31 against the biassing of the spring 30 out of the aperture 33. This is the condition shown in the drawings. This then allows the combined shaft 9 and 10 to be rotated to allow material to be transferred between the pack and the processing vessel. When the pack is separated from the vessel the plunger 31 moves into the aperture 33 due to the biassing of the spring 30. However the locking device may be operated manually by pulling on the handle 37 thus moving the plunger out of the aperture, allowing the shaft 10 to be rotated and the pack valve opened.

The valve system of the second embodiment shown in FIGS. 4–7 is part of a containment assembly similar to that shown in FIGS. 1–3. However the vessel and the pack are not shown in FIGS. 4–7 and will not be described again.

As shown particularly in FIG. 7, the system comprises a vessel valve body 103, a vessel valve disc 104, a vessel valve shaft 105, vessel valve stub axle 106, a pack valve body 107, a pack valve disc 108, a pack valve shaft 109 and a pack valve stub axle 110.

The vessel valve body 103 is generally disc-shaped and has a central circular aperture 111 sealingly closeable by the disc 104. The body 103 has a semi-cylindrical channel 112 which acts as a bearing for the vessel valve shaft 105 and diametrically opposite a further semi-cylindrical channel 113 (of smaller diameter than the channel 112) which receives the vessel valve stub axle 106. The upper surface of the body is formed with two rectangular cross-section channels. The first channel 114 is relatively narrow and deep and extends at right angles to and cuts across the semi-cylindrical channel 112. The second channel 115 is relatively wide and shallow and extends at right angles to and cuts across the further semicylindrical channel 113. The body 103 is also formed with eight circular holes 120 for bolts or other suitable means for fixing to the remainder of the vessel.

The vessel valve disc 104 is connected to the vessel valve shaft 105 and the vessel valve stub axle 106 by means of screws (not shown) passing through holes in half bosses 116, 117 formed at the disc edge. one half boss 116 being diametrically opposite the other 117. The shaft and axle seat in half bores 118 and 119 respectively. On the upper surface of the disc is a circular projection 121 which mates with a circular recess 122 formed on the facing surface of the pack valve disc 108 when the two discs are positioned alongside each other as shown on FIG. 5.

The vessel valve shaft 105 has a square section end portion 123 to which a handle or actuator (not shown) may be connected. The opposite end of the shaft 105 has a reduced diameter semicylindrical portion 124 which seats in the half bore 118 and is connected to the disc 104 by a screw (not shown). The shaft 105 has a formation in the form of a rectangular cross-section channel 125. A flat surface 126 is formed on the shaft as shown in FIG. 7.

The vessel valve stub axle 106, shown in FIG. 7 as being attached to the pack valve stub axle 110, has an end portion 127 which seats in the half bore 119 in the disc 104. Alternatively the stub axle 106 may be connected to the disc by a screw instead of to the stub axle 110. The stub axle 106 seats in the channel 113 and is formed with a squared-off formation 128.

The pack valve body 107 is in the form of a circular ring formed with a short pipe-like portion 129 and a flange 130 to enable the pack to be connected thereto. There is a central circular aperture 141 of equal diameter to the aperture 111 in the vessel valve body.

The underside of the pack valve body is formed with two ribs 131 and 132 of different rectangular cross-sections. These ribs are dimensioned to fit the channels 114 and 115, and because of the different dimensions, can only be fitted in one way. The body is also formed with semi-cylindrical channels for receiving the shaft 109 and stub axle 110 respectively.

The pack valve disc 108 is a mirror image of the vessel valve disc 104 apart from the provision of the circular recess 122 referred to above. It has two bosses 133 and 134 having semi-cylindrical bores similar to those in the vessel valve disc.

The pack valve shaft 109 has a reduced diameter semi-cylindrical portion 135 which seats in the half bore in the boss 133 and is thereby connected to the disc 108. The shaft 109 is also formed with a rectangular rib 136 which has complementary dimensions to the channel 125 in the shaft 105.

The pack valve stub axle 110 has a diameter equal to the channel 113 and is formed with a reduced diameter portion (not shown) which fits in the half bore in the boss 134. The axle 110 is connected by means of a screw (not shown) to the disc 108. The stub axle also has a formation on the form of a recess 137 for receiving the vessel valve stub axle 106.

When the pack valve is assembled and brought into position alongside the vessel valve, the mating of the projecting disc 121 with the recess 122, the rib 131 with the channel 114, the rib 132 with the channel 115, the rib 136 with the channel 125 and the squared-off end face 128 with the recess 137 ensures correct alignment and fitment. Once the two valves are together, the vessel valve shaft 105 may be rotated by a handle or actuator (not shown) attached to the square section end 123 so the combined shafts 105 and 109 rotate in the channel 112 (and the facing channel in the pack valve body). The combined stub axles 106 and 110 also rotate in the channel 113 (and the facing channel in the pack valve body) and the discs 104 and 108, now side-by-side turn to open the respective apertures 111 and 141 so material can be moved between the vessel and the pack.

When the pack is separate from the vessel the respective valves seal the apertures 141 and 111 to prevent either unwanted escape of material to the surroundings or unwanted contamination of material by the atmosphere.

We claim:

1. A valve system comprising a first member having a first circular aperture sealable by a first disc connected to a first shaft to rotate therewith, the first shaft being provided with a first formation thereon and having an axis of rotation extending diametrically of the first disc and the first aperture, a second member, separate from the first member, having a second circular aperture sealable by a second disc connected to a second shaft to rotate therewith, the second shaft being provided with a second formation thereon complementary to the first formation provided on the first shaft, the first and second members being capable of being connected together with the first disc positioned alongside the second disc with the first formation on the first shaft interengaged with the second formation on the second shaft and the first and second shafts and first and second discs being capable of simultaneous rotation about a single axis to open and close the valve system, at least one of the first and second formations on the first and second shafts provided with a safety interlock system which allows the first formation on the first shaft and the second formation on the second shaft to be disengaged only when at least one of the first and second apertures is closed by the valve system.

2. A valve system according to claim 1 in which different first and second formations are used for different materials intended to be passed through the valve system.

3. A valve stem according to claim 1 first and second formations comprise faces which extend perpendicularly of the single axis of rotation and provide guide means for correct positions of first and second shafts and associated first and second discs when being connected together.

4. A valve system according to claim 1 in which the first and second members are provided with first and second seals respectively against which the first and second discs seat in the closed position.

5. A valve system according to claim 1 in which a locking device is associated with one of the first and second members to ensure that the associated one of the first and second apertures on one of the first and second members remains closed while the first and second members are not connected.

6. A valve system according to claim 5 in which the locking device comprises a plunger capable of being positioned in an aperture in one of the first and second shafts said plunger thereby preventing rotation thereof.

7. A valve system according to claim 1 in which a first stub axle is provided with a formation and is connected to the first disc diametrically opposite to and coaxial with the first shaft, and a second stub axle is provided with a formation complementary to that provided on the first stub axle and is connected to the second disc diametrically opposite to and coaxial with the second shaft, whereby when the first and second members are connected together with the first disc positioned alongside the second disc, the formation on the first stub axle is interengaged with the formation on the second stub axle.

8. A valve system according to claim 7 wherein the second stub axle, instead of being connected to the second disc, is connected to the first disc.

9. A valve system according to claim 1 in which a first stub axle is provided with a formation and is connected to the first disc diametrically opposite to and coaxial with the first shaft, and a second stub axle is provided with a formation complementary to that provided on the first stub axle and is connected to the first stub axle coaxial with the first shaft, the formation on the first stub axle being interengaged with the formation on the second stub axle.

* * * * *